United States Patent
Sencich

(10) Patent No.: US 6,839,182 B1
(45) Date of Patent: Jan. 4, 2005

(54) OPTICAL ASSEMBLY HAVING AN OPTICAL DEVICE ALIGNED TO AN OPTICAL COLLIMATOR, AND ITS FABRICATION

(75) Inventor: Paul D. Sencich, Barrie (CA)

(73) Assignee: Raytheon Company, Waltham, MA (US)

( * ) Notice: Subject to any disclaimer, the term of this patent is extended or adjusted under 35 U.S.C. 154(b) by 16 days.

(21) Appl. No.: 10/401,307

(22) Filed: Mar. 26, 2003

(51) Int. Cl.[7] .................. G02B 27/30; G02B 7/02; G02B 6/32; G01N 21/00; H01S 3/04
(52) U.S. Cl. .............. 359/641; 359/819; 385/31; 385/33; 385/93; 356/440; 356/478; 372/36
(58) Field of Search ................... 359/811, 819, 359/641; 385/31, 33, 34, 92, 93; 356/440, 246, 478, 479, 489; 372/36; 156/245, 258

(56) References Cited

U.S. PATENT DOCUMENTS

| | | | | |
|---|---|---|---|---|
| 4,938,576 A | * | 7/1990 | Stana et al. | 359/641 |
| 4,993,801 A | * | 2/1991 | Sarraf | 359/641 |
| 5,032,026 A | * | 7/1991 | Jouve et al. | 356/478 |
| 5,490,158 A | * | 2/1996 | Mogi | 372/36 |
| 6,625,351 B2 | * | 9/2003 | Cox et al. | 385/33 |
| 6,633,433 B2 | * | 10/2003 | Bergstein et al. | 359/569 |
| 6,704,146 B2 | * | 3/2004 | Wu et al. | 359/641 |
| 2004/0004720 A1 | * | 1/2004 | Cliche et al. | 356/440 |

* cited by examiner

Primary Examiner—Loha Ben
(74) Attorney, Agent, or Firm—William C. Schubert

(57) ABSTRACT

An optical assembly includes an optical collimator having an outer periphery and an optical-path end opening. A collimator beam-path axis extends through the optical-path end opening. The optical assembly further includes a hollow bonding sleeve having a sidewall having an inner periphery receivable over and affixed to the outer periphery of the optical collimator, an endwall having an aperture therethrough in facing relation to the optical-path end opening of the optical collimator; and an optical device in registry with the aperture of the endwall and affixed to the endwall. To fabricate the optical assembly, the optical collimator and the bonding sleeve are separately prepared, the optical device is affixed in registry with the aperture of the endwall, the bonding sleeve is assembled to the optical collimator, the optical device is aligned with the collimator beam-path axis, and the bonding sleeve is affixed to the optical collimator.

19 Claims, 3 Drawing Sheets

OPTICAL ASSEMBLY HAVING AN OPTICAL DEVICE ALIGNED TO AN OPTICAL COLLIMATOR, AND ITS FABRICATION

BACKGROUND OF THE INVENTION

In an optical assembly such as an optical fiber communications system, a light beam is transmitted through an optical fiber. There are many situations where the light beam is extracted from the optical fiber so that it passes through free space, is processed with a discrete optical device, and then is re-introduced into a second optical fiber. The termination of the optical fiber that allows the light beam to be extracted from the optical fiber in a controlled manner, or reintroduced into the second optical fiber, is an optical collimator. Optical collimators are well known and widely used in the art.

The alignment between the optical collimator and the optical device is often critical to the successful operation of the optical assembly. A misalignment may prevent the successful operation of the optical device, as in the case of a thinfilm optical filter that achieves the proper light filtering only for a narrow range of the angle of incidence of the light beam. A misalignment may also result in an excessive attenuation of the light beam, so that cumulatively over a number of extractions and re-introductions the light beam loses its signal strength.

The optical collimator has a collimator beam-path axis, to which the optical device must be aligned. The alignment must be maintained over extended periods of time in service, during which time the optical assembly may be subjected to temperature changes, vibration, and adverse environmental influences. In a conventional fabrication approach for aligning the optical collimator and the optical device, the end of the optical collimator and the optical device are first carefully aligned. While the alignment is maintained, the end of the optical collimator and the optical device are bonded in a face-to-face relation using an optical adhesive positioned between the optical collimator and the optical device. The optical assembly is fabricated by using the same technique at each of the collimator/optical device interfaces.

While this approach is operable, the present inventor has recognized that it has several drawbacks. The alignment and bonding are difficult to achieve due to the small sizes of the components and the high degree of precision that is required. A great deal of skill is required in the assembler, and in any event the process is tedious and time-consuming. The process often has low yields of operable optical assemblies, particularly when there are a number of optical collimator/optical device interfaces in the optical assembly. Additionally, there is a layer of optical adhesive lying in the beam path between the collimator and the optical device. Optical adhesives having excellent optical properties are known and are used, but even the best available optical adhesives may change their properties over extended periods of time in service. Consequently, the optical and mechanical properties of the optical joint between the optical collimator and the optical device may change over time.

There is therefore a need for an improved approach to establishing the interface between an optical collimator and an optical device. The present invention fulfills this need, and further provides related advantages.

SUMMARY OF THE INVENTION

The present approach provides an optical assembly in which an optical collimator and an optical device are aligned and affixed together. The approach improves the ability to align the components, particularly in a production setting, thereby increasing the yields. It also eliminates the presence of any optical adhesive in the beam path, avoiding the possibility that the optical performance of the optical assembly will degrade over time in service due to changes in the optical properties of the optical adhesive.

In accordance with the invention, an optical assembly comprises an optical collimator having an outer periphery and an optical-path end opening. There is a collimator beam-path axis extending through the optical-path end opening. A hollow bonding sleeve has a sidewall with an inner periphery receivable over and affixed to the outer periphery of the optical collimator, and an endwall having an aperture therethrough in facing relation to the optical-path end opening of the optical collimator. An optical device, such as an optical filter, is in registry with the aperture of the endwall and is affixed to the endwall. The optical device is preferably optically aligned with the beam-path axis of the optical collimator. The optical device is preferably spaced apart from the optical collimator.

In the usual case, the outer periphery of the optical collimator and the inner periphery of the sidewall of the bonding sleeve are both substantially cylindrical. A collimator radius of the outer periphery of the optical collimator is greater than a sleeve radius of the inner periphery of the sidewall, so that the sidewall of the bonding sleeve may slip over the collimator.

The optical device preferably lies within the aperture and is supported in the aperture of the endwall. In the preferred case, the optical device has an optical-device periphery that is affixed to the aperture of the endwall. The optical device may instead lie over the aperture.

The bonding sleeve is preferably affixed to the collimator with a sidewall adhesive, and the optical device is preferably affixed to the bonding sleeve with an optical-device adhesive. Most preferably, however, the beam-path axis does not intersect any adhesive within the optical assembly. Instead, the sidewall of the bonding sleeve preferably includes a radially extending sidewall bond hole in the sidewall of the bonding sleeve, and the endwall of the bonding sleeve includes a radially extending endwall bond hole in the endwall of the bonding sleeve. The adhesive bonding is achieved by injecting the adhesive into these bond holes to tack the components together, and additional adhesive may thereafter be added to "backfill" the space between the components in a way that adhesive is not introduced into the beam-path axis. Thus, the sidewall is affixed to the optical collimator with a sidewall adhesive, and the optical device is affixed to the endwall with an optical-device adhesive. The sidewall adhesive and the optical-device adhesive are typically the same type of adhesive. The adhesives are desirably ultraviolet (UV)-curing adhesives.

A method for fabricating an optical assembly includes providing an optical collimator having an outer periphery and an optical-path end opening. There is a collimator beam-path axis extending through the optical-path end opening. A hollow bonding sleeve has a sidewall having an inner periphery receivable over the outer periphery of the optical collimator, and an endwall having an aperture therethrough in facing relation to the optical-path end opening of the optical collimator. The method includes the steps of affixing an optical device in registry with the aperture of the endwall, assembling the bonding sleeve to the optical collimator so that the inner periphery of the sidewall overlies the outer periphery of the optical collimator, but without affixing the bonding sleeve to the optical collimator, thereafter aligning the optical device with the collimator beam-path axis, and thereafter affixing the bonding sleeve to the optical collimator. Compatible features discussed herein may be used with the method.

The present approach thus provides for the indirect affixing of the optical device to the collimator in a way that allows for the alignment of the optical device and the collimator beam-path axis but does not interpose any adhesive into the beam path that can adversely affect the optical properties of the optical assembly. Significantly, there is no potential degradation of the optical quality of the joint and the optical assembly over time in service, even in environments that cause the adhesive to change its color and other optical properties. The labor required to accomplish the affixing and aligning is reduced, and there is less dependence upon the skill of the assembler, as compared with the prior approach.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
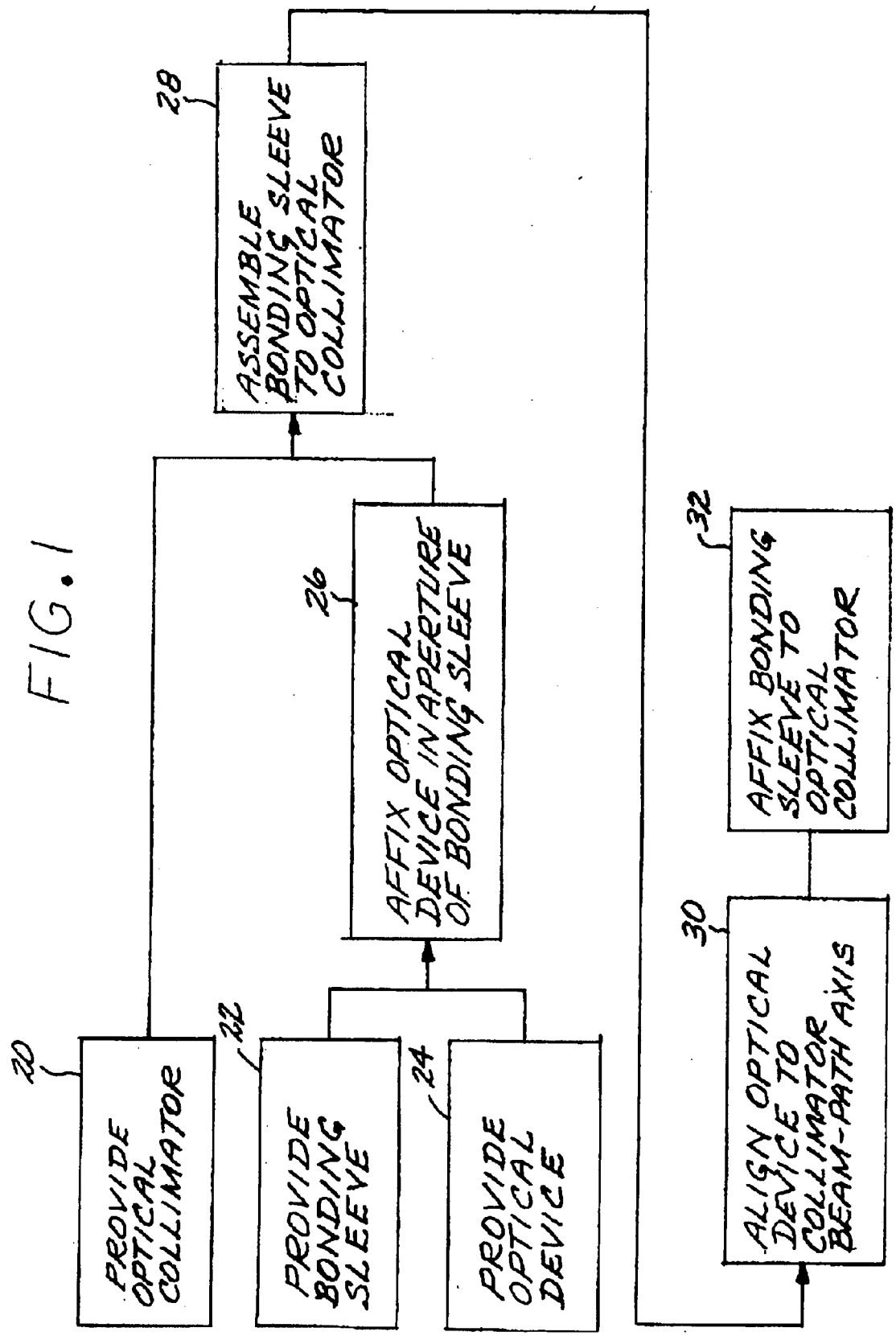
FIG. 1 is a block flow diagram of an approach for practicing the invention.
Figure 2:
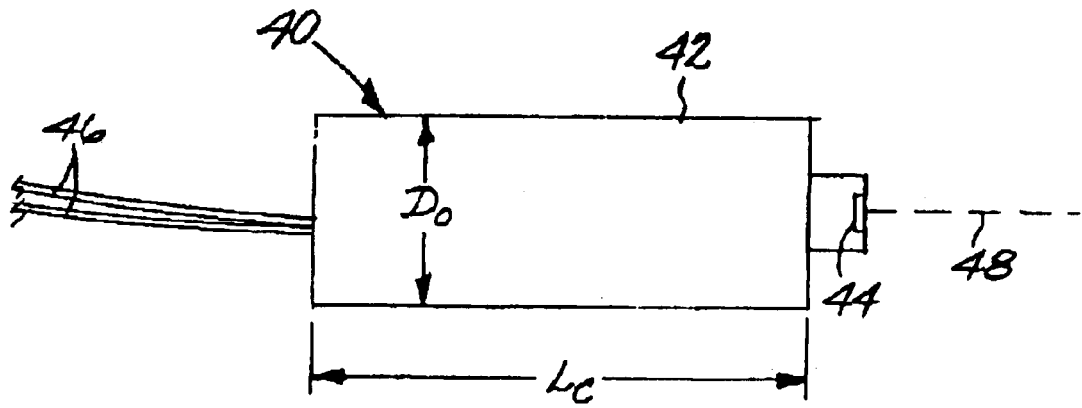
FIG. 2 is an elevational view of an optical collimator.
Figure 6:
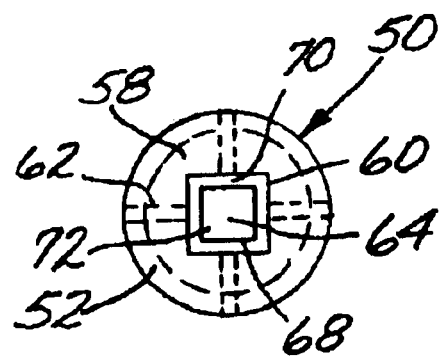
FIG. 6 is a schematic endwall elevational view of the bonding sleeve, with the optical device bonded in place.
Figure 7:
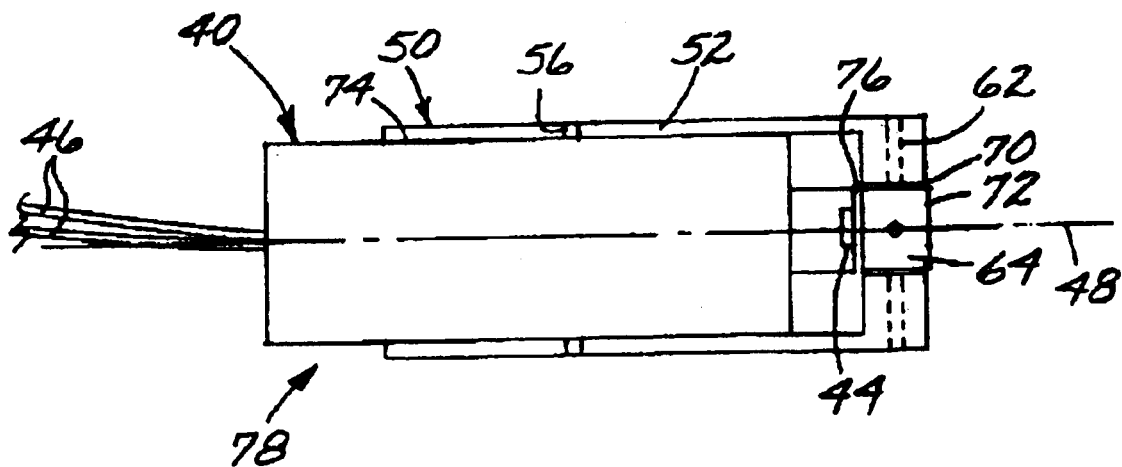
FIG. 7 is a schematic sectional view of the completed optical assembly.

FIG. 1 depicts the steps in a preferred approach for fabricating an optical assembly 78, FIGS. 2–6 illustrate the components of the optical assembly 78, and FIG. 7 illustrates the completed optical assembly 78.

In a first step of a preferred method for fabricating an optical assembly, an optical collimator 40 is provided, step 20. The optical collimator 40, shown in FIG. 2, has an outer periphery 42 and an optical-path end opening 44. At least one optical fiber 46 conducts a light beam to or from the optical collimator 40. A collimator bean-path axis 48 extends through the optical-path end opening 44. The optical collimator 40 either projects the light beam received from the optical fiber 46 along the collimator beam-path axis 48 (from left to right in FIG. 2), or transmits a light beam received along the collimator beam-path axis 48 (from right to left in FIG. 2) into the optical fiber 46, or both. In a preferred form of the optical collimator 40, the outer periphery 42 of the collimator 40 is substantially cylindrical and substantially cylindrically symmetric about the collimator beampath axis 48.

Figure 3:
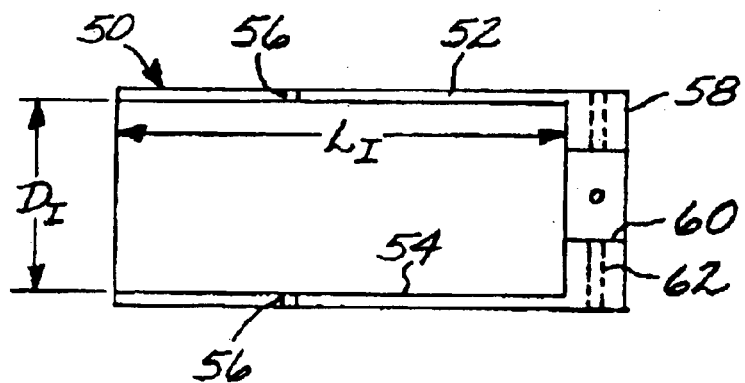
FIG. 3 is a schematic sectional view of a bonding sleeve.
Figure 4:
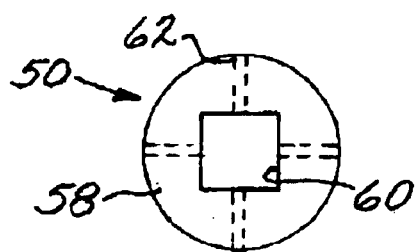
FIG. 4 is a schematic endwall elevational view of the bonding sleeve, showing the aperture.
Figure 5:
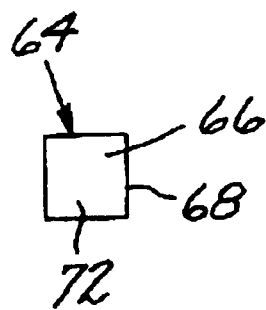
FIG. 5 is a plan view of an optical device.

A hollow bonding sleeve 50, shown in FIGS. 3–4, is provided, step 22. The bonding sleeve 50 has a sidewall 52 with an inner periphery 54 conformable with but receivable over the outer periphery 42 of the optical collimator 40. In the preferred case where the outer periphery 42 of the optical collimator 40 is substantially cylindrical with a diameter $D_O$, the inner periphery 54 of the sidewall 52 of the bonding sleeve 50 is also substantially cylindrical with a diameter $D_I$ that is slightly greater than $D_O$. An interior length $L_I$ of the sidewall 52 is typically less than a length $L_C$ of the optical collimator 40, but it need not be so. The sidewall 52 of the bonding sleeve 50 preferably further includes at least one, and preferably several, radially extending (relative to the collimator beam-path axis 48, when the bonding sleeve 50 is assembled to the optical collimator 40) sidewall bond holes 56 in and through the sidewall 52 of the bonding sleeve 50. Most preferably, there are four sidewall bond holes 56 arranged equidistantly around the circumference of the sidewall 52.

The hollow bonding sleeve 50 further includes an endwall 58 that is located at one end of the sidewall 52. The endwall 58 closes the end of the sidewall 52, except for an aperture 60 through the endwall 58. When assembled, the aperture 60 is in facing relation to the optical-path end opening 44 of the optical collimator 40. The endwall 58 of the bonding sleeve 50 preferably further includes at least one, and most preferably several, radially extending (relative to the collimator beam-path axis 48, when the bonding sleeve 50 is assembled to the optical collimator 40) endwall bond holes 62 in and through the endwall 58 of the bonding sleeve 50. Most preferably, there are four endwall bond holes 62 arranged equidistantly around the circumference of the endwall 58.

An optical device 64, illustrated in FIG. 4, is provided, numeral 24. The optical device 64 may be of any operable type, but preferably is a thin-film optical filter 66. The optical device 64 has a device periphery 68.

The optical device 64 is affixed in registry with the aperture 60 of the endwall, step 26. Preferably the size and shape of the aperture 60 is selected such that the device periphery 68 fits within the aperture 60, as illustrated in FIG. 6. In this case, the optical device 64 is affixed within the aperture 60. The size and shape of the aperture 60 may instead be such that the device periphery 68 does not fit within the aperture 60, and in this case the optical device 64 is affixed to the endwall 58 but not within the aperture 60. Either approach is within the scope of the term "affixed in registry", because the optical device 64 is aligned with the aperture 60 in each case.

The optical device 64 is preferably affixed in registry with the aperture 60 with an optical device adhesive bond 70. The optical device adhesive bond 70 is preferably formed by assembling the optical device 64 to the endwall 58 in registry with the aperture 60. For the illustrated preferred case where the optical device 64 lies within the aperture 60, an optical-device adhesive is thereafter injected into the endwall bond holes 62 so that it contacts both the aperture 60 and the device periphery 68. The optical-device adhesive is hardened to form at least a portion of the optical device adhesive bond 70. The optical-device adhesive is preferably an ultraviolet (UV)-curing adhesive, and it is cured and hardened by exposure to the recommended UV curing cycle. If the injected optical-device adhesive does not completely bond the entire device periphery 68 to the aperture 60, additional optical-device adhesive may optionally be added and cured to complete the bond to the device periphery 68, a process termed "backfilling". Care is taken so that none of the optical device adhesive overlies either face 72 of the optical device 64 or otherwise is positioned so that it is intersected by the light beam traveling along the collimator beam-path axis 48, after the bonding sleeve 50 is later assembled and bonded to the optical collimator 40.

The bonding sleeve 50 is assembled to the optical collimator 40 so that the inner periphery 54 of the sidewall 52 overlies at least a portion of the outer periphery 42 of the optical collimator 40, step 28. In the preferred case, because $D_o$ is greater than $D_f$, the sidewall 52 of the bonding sleeve 50 slides over the outer periphery 42 of optical collimator 40. The bonding sleeve 50 and the optical collimator 40 may be positioned such that the optical device 64 is spaced apart from the optical collimator 40 with a small gap 76 therebetween, or the optical device 64 may be made to touch the optical collimator 40. FIG. 7 illustrates the assembly. At this point, the bonding sleeve 50 is not affixed to the optical collimator 40.

The optical device 64 is thereafter aligned with the collimator beam-path axis 48, step 30. There is sufficient play in the unbonded assembly to permit this alignment 30, using appropriate fixturing and optical alignment tools. In one alignment approach, the integral unit of the bonding sleeve 50 and its affixed optical device 64 are held stationary, and the optical collimator 40 is inserted into the bonding sleeve 50 and held in place with an optical manipulator stage. The tilt and axial position of the optical collimator 40 are manipulated by the manipulating stage until the correct alignment is achieved. In another alignment approach, the optical device 64 protrudes axially by a small amount out of the aperture 60 of the bonding sleeve 50. The optical device 64 and the bonding sleeve 50 are held, as by a vacuum check, on an optical manipulator stage that may adjusted in tilt and axial position. The optical collimator 40 is held rigidly and is inserted into the bonding sleeve 50. The integral unit of the optical device 64 and the bonding sleeve 50 is then manipulated in tilt and axial position until alignment is achieved. In each case, the degree of alignment is preferably determined optically by observing the optical performance of the assembly in the type of application for which it is designed, for example by observing the reflection and/or transmission filtering effects in the case where the optical device 64 is an optical filter. As used herein, "alignment" means any desired angular and spacing relation between the optical device 64 and the optical collimator 40.

After the alignment is accomplished and held in position with the alignment fixturing, the bonding sleeve 50 is affixed to the optical collimator 40, step 32. The affixing is accomplished in a manner similar to that described earlier in relation to step 26, but applied to the bonding of the bonding sleeve 50 to the optical collimator 40. Preferably, a sidewall adhesive is injected into the sidewall bond holes 56 so that it contacts both the outer periphery 42 of the optical collimator 40 and the inner periphery 54 of the sidewall 52. The sidewall adhesive is hardened to form at least a portion of a sidewall adhesive bond 74. The optical-device adhesive is preferably an ultraviolet (UV)-curing adhesive, and it is cured and hardened by exposure to the recommended UV curing cycle. Most preferably and for simplicity in manufacturing operations, the sidewall adhesive is the same material as the optical-device adhesive. If the injected sidewall adhesive does not completely bond the entire outer periphery 42 to the inner periphery 54, additional sidewall adhesive may optionally be added and cured to complete the sidewall adhesive bond 74, a backfilling process. Care is taken so that none of the sidewall adhesive is positioned so that it is intersected by the optical beam path axis 48 or a light beam traveling along the collimator beam-path axis 48.

The resulting structure is the optical assembly 78 shown in FIG. 7.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An optical assembly comprising:
   an optical collimator having an outer periphery and an optical-path end opening, wherein there is a collimator beam-path axis extending through the optical-path end opening;
   a hollow bonding sleeve having
      a sidewall having an inner periphery receivable over and affixed to the outer periphery of the optical collimator, and
      an endwall having an aperture therethrough in facing relation to the optical-path end opening of the optical collimator; and
   an optical device in registry with the aperture of the endwall and affixed to the endwall.

2. The optical assembly of claim 1, wherein the outer periphery of the optical collimator and the inner periphery of the sidewall of the bonding sleeve are both substantially cylindrical, and wherein a collimator radius of the outer periphery of the optical collimator is less than a sleeve radius of the inner periphery of the sidewall.

3. The optical assembly of claim 1, wherein the optical device is optically aligned with the beam-path axis of the optical collimator.

4. The optical assembly of claim 1, wherein the optical device has an optical-device periphery that is affixed to the aperture of the endwall.

5. The optical assembly of claim 1, wherein the optical device is supported in the aperture of the endwall.

6. The optical assembly of claim 1, wherein the beam-path axis does not intersect any adhesive within the optical assembly.

7. The optical assembly of claim 1, wherein the optical device is an optical filter.

8. The optical assembly of claim 1, wherein the optical device is spaced apart from the optical collimator.

9. The optical assembly of claim 1, wherein the sidewall of the bonding sleeve further includes
   a radially extending sidewall bond hole in the sidewall of the bonding sleeve.

10. The optical assembly of claim 1, wherein the endwall of the bonding sleeve further includes
    a radially extending endwall bond hole in the endwall of the bonding sleeve.

11. The optical assembly of claim 1, wherein the sidewall is affixed to the optical collimator with a sidewall adhesive.

12. The optical assembly of claim 1, wherein the optical device is affixed to the endwall with an optical-device adhesive.

13. An optical assembly comprising:
    an optical collimator having a substantially cylindrical outer periphery and an optical-path end opening, wherein there is a collimator beam-path axis extending through the optical-path end opening;
    a hollow bonding sleeve having
       a sidewall having a substantially cylindrical inner periphery receivable over and affixed to the substantially cylindrical outer periphery of the optical collimator, and
       an endwall having an aperture therethrough in facing relation to the optical-path end opening of the optical collimator; and an optical device supported in and affixed to the aperture of the endwall and optically aligned with the collimator beam-path axis, wherein the collimator beam-path axis does not intersect any adhesive within the optical assembly.

14. The optical assembly of claim 13, wherein the optical device is an optical filter.

15. The optical assembly of claim 13, wherein the optical device is spaced apart from the optical collimator.

16. The optical assembly of claim 13, wherein the sidewall of the bonding sleeve further includes
   a radially extending sidewall bond hole in the sidewall of the bonding sleeve.

17. The optical assembly of claim 13, wherein the endwall of the bonding sleeve further includes
   a radially extending endwall bond hole in the endwall of the bonding sleeve.

18. The optical assembly of claim 13, wherein the sidewall is affixed to the optical collimator with a sidewall adhesive, and the optical device is affixed to the endwall with an optical-device adhesive.

19. A method for fabricating an optical assembly, comprising the steps of:

providing an optical collimator having an outer periphery and an optical-path end opening, wherein there is a collimator beam-path axis extending through the optical-path end opening;

providing a hollow bonding sleeve having
   a sidewall having an inner periphery receivable over the outer periphery of the optical collimator, and
   an endwall having an aperture therethrough in facing relation to the optical-path end opening of the optical collimator;

affixing an optical device in registry with die aperture of the endwall;

assembling the bonding sleeve to the optical collimator so that the inner periphery of the sidewall overlies the outer periphery of the optical collimator, but without affixing the bonding sleeve to the optical collimator, thereafter aligning the optical device with the collimator beam-path axis; and thereafter affixing the bonding sleeve to the optical collimator.

* * * * *